(12) United States Patent
Stefanescu et al.

(10) Patent No.: US 12,032,561 B2
(45) Date of Patent: Jul. 9, 2024

(54) SOURCE-ADAPTED DATA RETRIEVAL FOR MULTI-TENANT SYSTEM

(71) Applicant: AMADEUS S.A.S., Biot (FR)

(72) Inventors: Radu-Constantin Stefanescu, Rye, NH (US); Jeffrey P Duquette, Stratham, NH (US); Michael Kennie, Kennebunk, ME (US); Adam Edward Bungert, Dover, NH (US)

(73) Assignee: AMADEUS S.A.S., Biot (FR)

(*) Notice: Subject to any disclaimer, the term of this patent is extended or adjusted under 35 U.S.C. 154(b) by 249 days.

(21) Appl. No.: 17/335,616

(22) Filed: Jun. 1, 2021

(65) Prior Publication Data
US 2022/0382747 A1    Dec. 1, 2022

(51) Int. Cl.
*G06F 16/215* (2019.01)
*G06F 16/23* (2019.01)

(52) U.S. Cl.
CPC ........ *G06F 16/2386* (2019.01); *G06F 16/215* (2019.01)

(58) Field of Classification Search
CPC ......... G06F 16/23; G06F 16/215; G06F 16/27
See application file for complete search history.

(56) References Cited

U.S. PATENT DOCUMENTS

| | | | |
|---|---|---|---|
| 8,812,482 B1* | 8/2014 | Kapoor | G06F 16/273 |
| | | | 707/706 |
| 2017/0069046 A1* | 3/2017 | Slipakoff | G06Q 10/1095 |
| 2019/0228020 A1* | 7/2019 | Sawatzky | G06F 16/273 |
| 2021/0081379 A1* | 3/2021 | Buehne | G06F 16/275 |
| 2022/0107959 A1* | 4/2022 | Caron | G06F 16/27 |

FOREIGN PATENT DOCUMENTS

WO    WO-2020161020 A1    8/2020

OTHER PUBLICATIONS

Tanenbaum, Andrew S. et al., "7.4.3 Content Distribution", Distributed Systems: Principles and Paradigms, 2006, Prentice Hall, ISBN: 978-0-13-239227-3, pp. 302-305, Retrieved from the Internet at URL: https://vowi.fsinf.at/images/b/bc/TU_Wien-Verteilte_Systeme_VO_%28Goschka%29_-_Tannenbaum-distributed_systems_principles_and_paradigms_2nd_edition.pdf.

* cited by examiner

*Primary Examiner* — Maher N Algibhah
(74) *Attorney, Agent, or Firm* — Perry + Currier

(57) ABSTRACT

A method includes: maintaining, at an integration computing device, a scheduling parameter corresponding to a source computing device maintaining a plurality of source data records with record identifiers; receiving, from the source computing device, a plurality of modification indicators, each modification indicator generated at the source computing device in response to modification of a source data record, and containing the record identifier of the source data record; storing the modification indicators in a repository; according to the scheduling parameter, periodically obtaining a subset of the source data records from the source computing device, by: retrieving the modification indicators from the repository; generating a bulk record request containing the plurality of record identifiers from the retrieved modification indicators; transmitting the bulk record request to the source computing device; and responsive to transmitting the bulk record request, receiving the subset of source data records from the source computing device.

19 Claims, 6 Drawing Sheets

SOURCE-ADAPTED DATA RETRIEVAL FOR MULTI-TENANT SYSTEM

FIELD

The specification relates generally to data processing systems, and specifically to source-adapted data retrieval mechanisms for a multi-tenant data processing system.

BACKGROUND

Data processing systems may be implemented as cloud-based applications. for example, an application provider may implement respective deployments of a given cloud-based application for each of several operators of the cloud-based application. Each deployment, in other words, is configured as a single-tenant system, housing only the data of the corresponding operator. Each deployment of a cloud-based application may also be assigned distinct computational resources (e.g. processing hardware) from the other deployments, and may be subject to distinct performance requirements and usage patterns.

Although the above arrangement is relatively straightforward to scale for a given operator, implementing applications and/or data storage that rely on access to data from multiple distinct deployments (i.e. data corresponding to multiple operators) may negatively affect the performance of the underlying operator-specific deployments, and/or necessitate extensive and costly migration activities.

SUMMARY

An aspect of the specification provides a method, comprising: maintaining, at an integration computing device, a scheduling parameter corresponding to a source computing device maintaining a plurality of source data records having respective record identifiers; receiving, at the integration computing device from the source computing device, a plurality of modification indicators, each modification indicator generated at the source computing device in response to modification of a source data record, and containing the record identifier of the source data record; storing the modification indicators in a repository; according to the scheduling parameter, periodically obtaining a subset of the source data records from the source computing device, by: retrieving the modification indicators from the repository; generating a bulk record request containing the plurality of record identifiers from the retrieved modification indicators; transmitting the bulk record request to the source computing device; and responsive to transmitting the bulk record request, receiving the subset of source data records from the source computing device.

Another aspect of the specification provides a computing device, comprising: a memory storing a scheduling parameter corresponding to a source computing device maintaining a plurality of source data records having respective record identifiers; a communications interface; and a processor coupled with the memory and the communications interface, the processor configured to: receive, via the communications interface from the source computing device, a plurality of modification indicators, each modification indicator generated at the source computing device in response to modification of a source data record, and containing the record identifier of the source data record; store the modification indicators in a repository in the memory; according to the scheduling parameter, periodically obtain a subset of the source data records from the source computing device, wherein the processor is configured, to periodically obtain the subset, to: retrieve the modification indicators from the repository; generate a bulk record request containing the plurality of record identifiers from the retrieved modification indicators; transmit the bulk record request to the source computing device; and responsive to transmitting the bulk record request, receive the subset of source data records from the source computing device.

A further aspect of the specification provides a non-transitory computer-readable medium storing instructions executable by a processor of an integration computing device to: maintain a scheduling parameter corresponding to a source computing device maintaining a plurality of source data records having respective record identifiers; receive, from the source computing device, a plurality of modification indicators, each modification indicator generated at the source computing device in response to modification of a source data record, and containing the record identifier of the source data record; store the modification indicators in a repository; according to the scheduling parameter, periodically obtain a subset of the source data records from the source computing device, by: retrieving the modification indicators from the repository; generating a bulk record request containing the plurality of record identifiers from the retrieved modification indicators; transmitting the bulk record request to the source computing device; and responsive to transmitting the bulk record request, receiving the subset of source data records from the source computing device.

BRIEF DESCRIPTIONS OF THE DRAWINGS

Embodiments are described with reference to the following figures.

DETAILED DESCRIPTION

Figure 1:
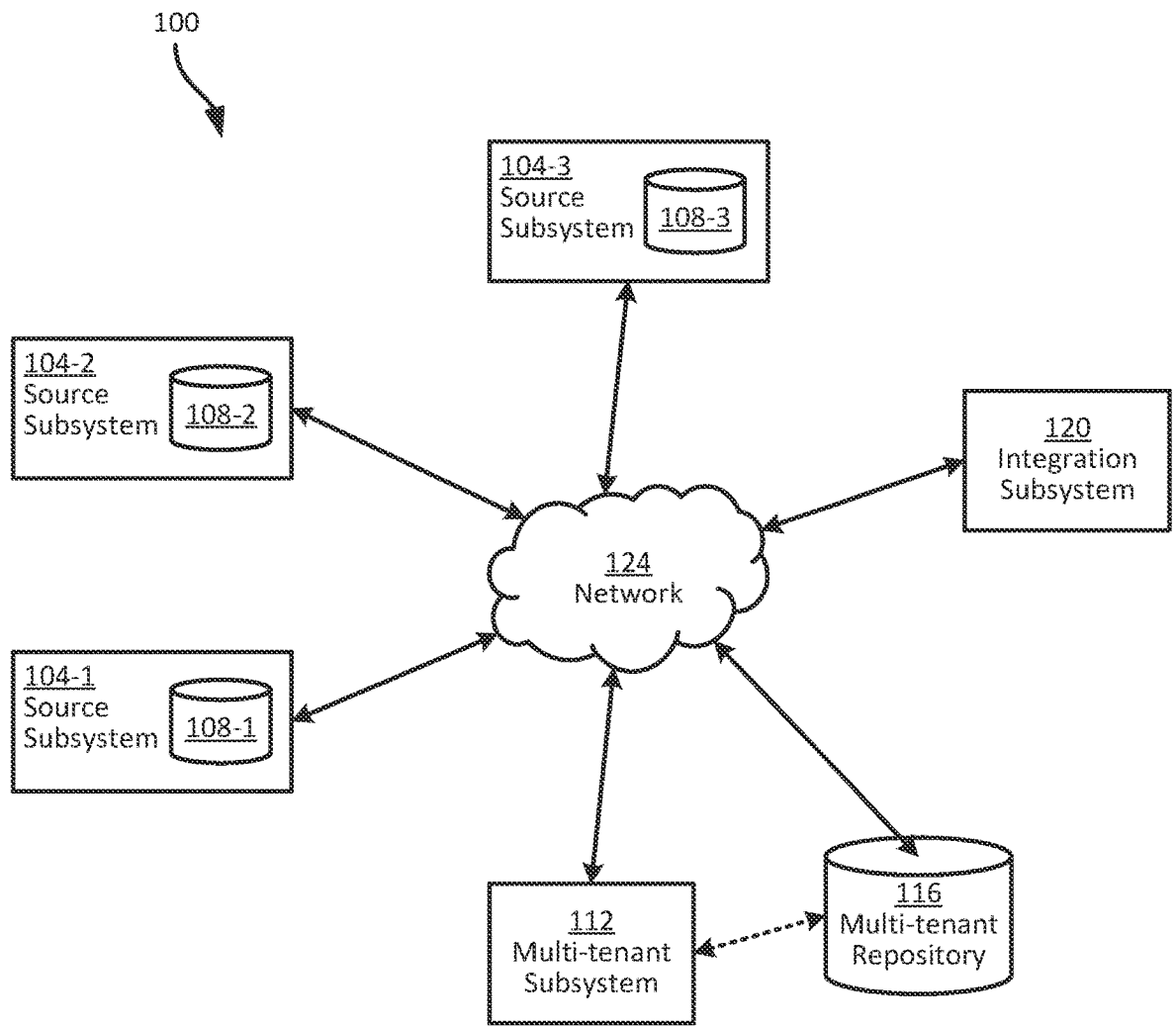
FIG. 1 is a diagram of a system for source-adapted data retrieval.

FIG. 1 illustrates a system 100 for source-adapted multi-tenant data retrieval. The system 100 includes a plurality of source subsystems 104, of which three examples 104-1, 104-2, and 104-3 are illustrated. As will be apparent, smaller or greater numbers of source subsystems 104 can be included in other implementations of the system 100. The source subsystems 104 may also be referred to as source computing devices 104, or simply as sources 104. Each source 104 can be implemented on a single computing device, or in a distributed manner with a plurality of computing devices logically combined to implement the source 104.

Each source 104 includes a plurality of source data records, e.g. in a database 108 or other suitable record storage mechanism (thus, three example databases 108-1, 108-2, and 108-3 are illustrated in FIG. 1). The data contained in the source data records can vary widely, and is not particularly relevant to the functionality described in detail herein. For example, the source data records can define routing tables for controlling the delivery of network communications. In another example, the source data records can define data representing hotel reservations or other product or service purchases.

In general, each source 104 is controlled separately from the other sources 104. For example, each source 104 can be operated by a different entity, such as distinct hotel operators, airlines, or the like (dependent on the nature of the source data records in the databases 108). As such, the contents of each database 108 generally does not overlap with any other databases 108, and exchange of data between databases 108 is limited or non-existent. The sources 104 are, in other words, single-tenant subsystems.

However, the source data records in the respective databases 108 can nevertheless contain data of the same type as one another. For example, each database 108 can contain source data records defining hotel reservations. In some examples, each source 104 (and corresponding database 108) can be a distinct implementation of a cloud-based application, such as a hotel reservation application (although as noted above, a wide variety of other data types may also be handled by the sources 104, and the particular type of data in the databases 108 has no impact on the functionality described herein). The above cloud-based application can, for example, be deployed by an entity such as an information technology (IT) services provider, on behalf of each of the sources 104.

The cloud-based deployment mentioned above, although relatively simple to scale for a given source 104—e.g. by allocating additional hardware to that source, and/or initiating execution of additional instance(s) of the cloud-based application connected to the relevant database 108—complicates central processing of the source data records by the IT services provider. The sources 104 may not have entirely consistent data formats and communication protocols, for example. Further, the computational load imposed on each source 104, e.g. by other entities not shown in FIG. 1, may vary widely between sources 104. Processes that attempt to retrieve data from each source 104 for processing in a centralized, multi-tenant subsystem 112 and/or storage in a multi-tenant repository 116, may therefore encounter difficulties in obtaining and formatting the data, and may also impose undue load on the sources 104, which may in turn disrupt the operations of the sources 104.

Multi-tenant processing may be employed to generate analytical reports by the IT services provider, to implement additional cloud-based applications that consume at least certain portions of the source data from the databases 108, or the like. For instance, in the example shown in FIG. 1, the multi-tenant subsystem 112 can be configured to generate analytical data derived from the source data in the databases 108, e.g. for use by the IT services provider in optimizing hardware deployments or the like. In some examples, source data from the databases 108 can be collected in the multi-tenant repository 116, enabling access to such data by the subsystem 112, or by additional cloud-based applications that are deployed by the IT services provider for use by the entities operating the sources 104.

To enable population of the repository 116 with data collected from the sources 104, such that the repository 116 contains a multi-tenant representation of the sources 104, the system 100 includes an integration subsystem 120 (also referred to as an integrator 120), connected to the remaining components of the system 100 via a network 124 (e.g. a suitable combination of local and wide-area networks).

The integration subsystem 120, as will be discussed in greater detail below, is configured to collect detections of modifications to source data records. The integration subsystem 120 is further configured to request source data records from the sources 104 based on such detections, according to source-specific scheduling parameters that can be tuned to mitigate negative effects of the source data requests on the performance of each source 104. Having retrieved source data records, the integration subsystem 120 can then provide the source data records to either or both of the subsystem 112 and the repository 116 for further processing. In other words, the integration subsystem 120 provides the technical advantage of enabling the importation of data from distinct single-tenant subsystems (the sources 104) into a multi-tenant subsystem (e.g. the repository 116), while avoiding disruptions to the operations of the single-tenant subsystems.

Before discussing the operation of the system 100, and particularly the integrator 120, in greater detail, certain internal components of the integrator 120 and an example source 104 will be described in greater detail, with reference to FIGS. 2A and 2B.

Figure 2A:
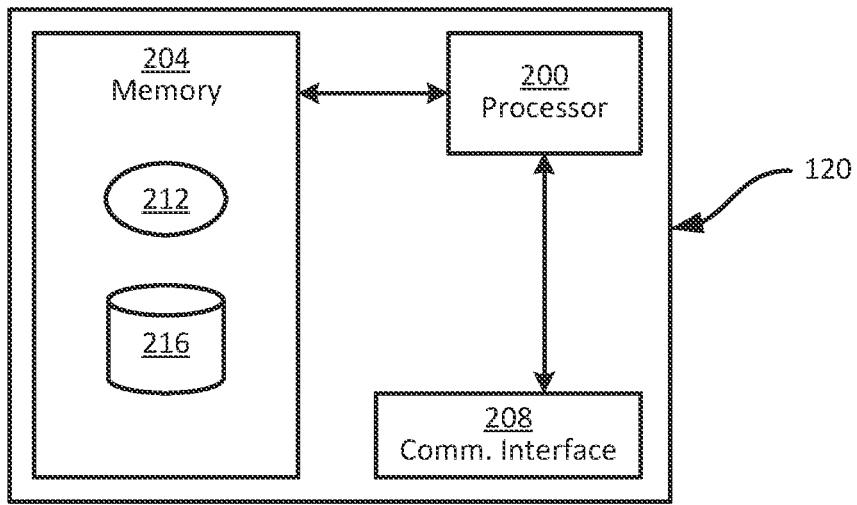
FIG. 2A is a diagram of certain internal components of the integration subsystem of FIG. 1.

Referring to FIG. 2A, the integrator 120 includes at least one processor 200, such as a central processing unit (CPU) or the like. The processor 200 is interconnected with a memory 204, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs). As will be apparent, the integrator 120 is illustrated as a single computing device, and is referred to as a computing device herein, but may also be implemented in a distributed architecture. References in the discussion below to the integrator as a computing device are made for simplicity only, and not to limit any particular feature of the integrator 120 to a specific architecture.

The processor 200 is also interconnected with a communications interface 208, which enables the integrator 120 to communicate with the other computing devices of the system 100 via the network 124. The communications interface 208 therefore includes any necessary components (e.g. network interface controllers (NICs), radio units, and the like) to communicate via the network 124. The specific components of the communications interface 208 are selected based on the nature of the network 124. The integrator 120 can also include input and output devices connected to the processor 200, such as keyboards, mice, displays, and the like (not shown).

The memory 204 stores a plurality of computer-readable programming instructions, executable by the processor 200, in the form of various applications, including a source data integration application 212. As will be understood by those skilled in the art, the processor 200 executes the instructions of the application 212 in order to perform various actions defined by the instructions contained therein. In the description below, the processor 200, and more generally the integrator 120, are said to be configured to perform those actions. It will be understood that they are so configured via the execution (by the processor 200) of the instructions of the applications stored in memory 204.

Execution of the application 212 configures the integrator 120 to receive modification indicators from the sources 104, indicating changes made to source data requests. The modification indicators are stored in a modification indicators repository 216 stored in the memory 204, or otherwise accessible to the processor 200. As discussed below, execution of the application 212 configures the processor 200 to request source data records from the sources 104, using the contents of the modification indicators repository 216, as well as scheduling parameters defined by the application 212.

Figure 2B:
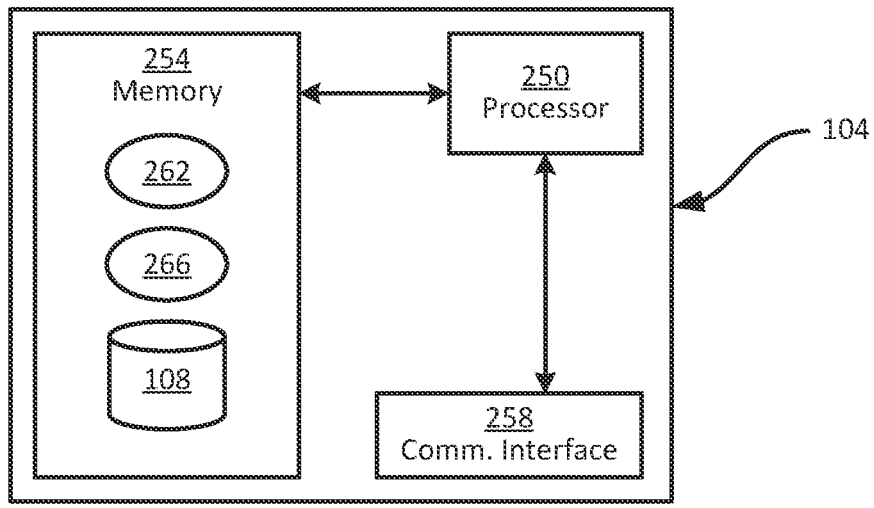
FIG. 2B is a diagram of certain internal components of a source subsystem of FIG. 1.

Turning to FIG. 2B, a generic source 104 is illustrated. Although each source 104 in the system 100 need not be implemented identically, each source 104 includes the components shown in FIG. 2B. The source 104 includes at least one processor 250, such as a central processing unit (CPU) or the like, interconnected with a memory 254, implemented as a suitable non-transitory computer-readable medium (e.g. a suitable combination of non-volatile and volatile memory subsystems). The processor 250 and the memory 254 are generally comprised of one or more integrated circuits (ICs). As noted above in connection with the integrator 120, the source 104 can be implemented in a distributed manner in some examples.

The processor 250 is also interconnected with a communications interface 258, which enables the source 104 to communicate with the other computing devices of the system 100 via the network 124. The communications interface 258 therefore includes any necessary components (e.g. network interface controllers (NICs), radio units, and the like) to communicate via the network 124. The specific components of the communications interface 258 are selected based on the nature of the network 124. The source 104 can also include input and output devices connected to the processor 250, such as keyboards, mice, displays, and the like (not shown).

The memory 254 stores a plurality of computer-readable programming instructions, executable by the processor 250. The instructions stored in the memory 254 include primary source application 262, and a modification detector 266. The primary source application 262 configures the processor 250 to implement the primary function of the source 104, such as creating and maintaining hotel reservations or other product or service inventory. Execution of the primary application 262 may therefore include communications with various other computing devices not shown in FIG. 1, and involves the modification (include creation and deletion) of source data records in the database 108.

The primary application 262 also exposes an application programming interface (API) usable by other devices, including the integrator 120, to request source data records. The level of granularity afforded by the API may vary from source to source, but is assumed to provide at least a bulk record request function, by which the integrator 120 or another device may submit a set of record identifiers corresponding to source data records in the database 108. In response to such a request, the processor 250 is configured to retrieve and send the full content of each identified record. Execution of the primary application 262 may impose widely varying loads on the processor 250, and in general activity imposed on the processor 250 by other factors, such as the requesting of records by the integrator 120, risks interfering with the timely execution of the primary application 262.

Execution of the modification detector 266 configures the processor 250 to generate and send modification indicators to the integrator 120 in response to modification of any source data record in the database 108. The modification indicators are then used by the integrator 120 to request source data records from the database 108, while mitigating the impact of such requests on the performance of the source 104 (specifically as such performance relates to the execution of the primary application 262).

The functionality of the applications 212, 262 and 266 need not be divided as shown. For example, the application 212 can be deployed as a plurality of distinct applications configured to interact with one another to implement the functionality discussed below. In further examples, some or all of the applications 212, 262, 266 can be implemented using pre-programmed hardware or firmware elements (e.g., application specific integrated circuits (ASICs), electrically erasable programmable read-only memories (EEPROMs), etc.), or other related components.

Figure 3:
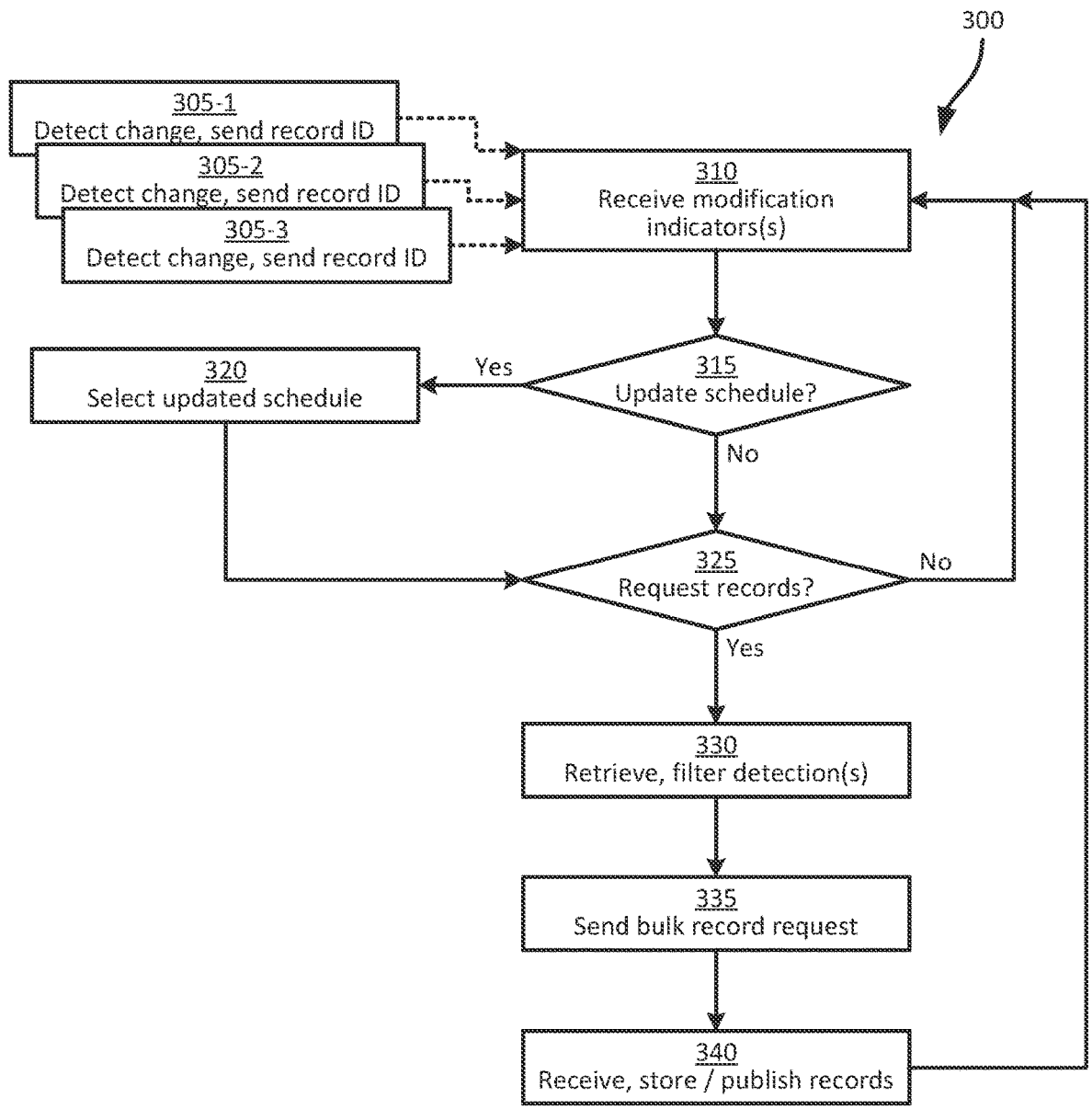
FIG. 3 is a flowchart of a method of source-adapted data retrieval.

Turning to FIG. 3, the functionality of the system 100 will be described in further detail. FIG. 3 illustrates a method 300 of source-adapted data retrieval, discussed below in conjunction with its performance within the system 100. Except as noted specifically below, the steps shown in the method 300 are performed by the integrator 120.

At block 305, each of the sources 104, specifically via execution of the respective modification detector applications 266, are configured to detect modifications to the source data records in the databases 108, and to transmit modification indicators to the integrator 120. Three instances of block 305, namely blocks 305-1, 305-2, and 305-3, are therefore shown, as each source 104 performs the above functionality only in respect of the corresponding database 108. Modification indicators are generated by a given source 104 in response to any modification to a database 108, including the creation of a new source data record, the deletion of a source data record, or an update applied to an existing source data record.

The frequency with which each source 104 reports modification indicators to the integrator 120 is not particularly limited, nor do the sources 104 need to report modification indicators at the same times, or with the same frequencies. For example, one source 104 can be configured to send a modification indicator for every record modification detected, while another source 104 can be configured to send modification indicators in a batch twice per day, or upon reaching a threshold number of detected modifications.

In any event, each modification indicator includes a record identifier of the record whose modification was detected. As will be apparent to those skilled in the art, each record in the databases 108 includes an identifier, such as a primary key. The modification indicator sent at block 305 contains the identifier, but does not include the remainder of the record. That is, the modification indicators do not include the data portions of any modified records. The modification indicators can include an identifier of the source 104 itself, such as a network identifier (e.g. an IP address), or the like. In other examples, however, the integrator 120 can infer or otherwise detect the identity of the relevant source 104 upon receipt of the modification indicator. Further, in some examples the modification indicator can include a timestamp indicating when the detected modification occurred. In other examples, the integrator 120 can append a timestamp upon receipt of the modification indicator, e.g. based on the time of receipt.

At block 310, the integrator 120 is configured to receive the above-mentioned modification indicators. Although the blocks 305 and 310 are shown at the beginning of the method 300, in practice the performance of blocks 305 and 310 can continue throughout the performance of the method 300. That is, the sources 104 may continue to detect modifications, and therefore send modification indicators to the integrator 120, in parallel with the integrator 120 performing the remainder of the method 300.

In response to receiving a modification indicator at block 310, the integrator 120 stores the modification indicator in the repository 216. The repository 216 therefore accumulates a set of record identifiers corresponding to records that have been modified at the sources 104. Because the repository 216 contains modification indicators from a plurality of sources 104, the repository 216 also stores, in association with each record identifier, a source identifier. The source identifier can be received as a portion of the modification indicator, or can be otherwise inferred by the integrator 120, e.g. based on the sending network address of the modification indicator.

Figure 4:
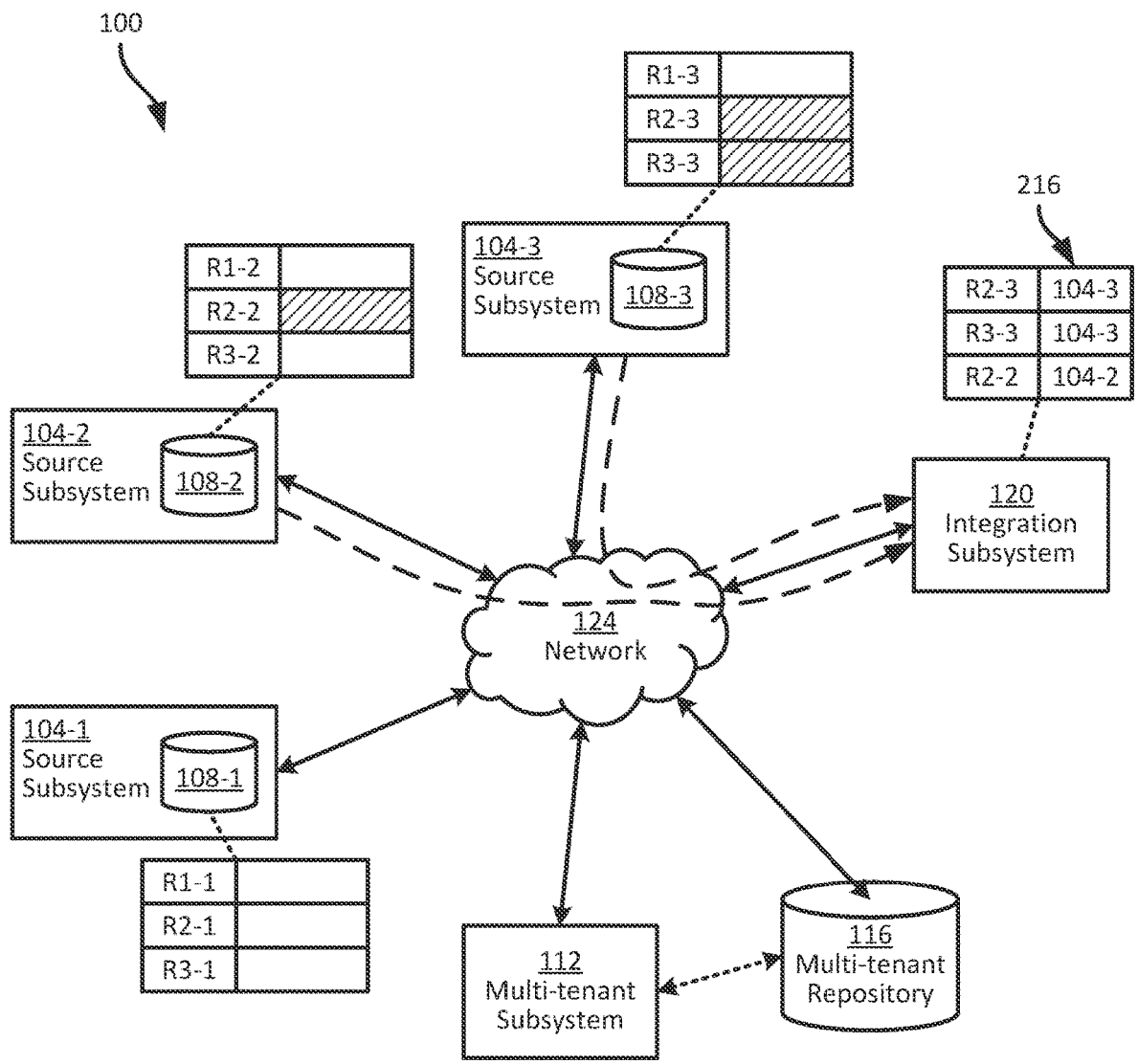
FIG. 4 is a diagram illustrating example performances of blocks 305 and 310 of the method of FIG. 3.

Turning briefly to FIG. 4, an example performance of blocks 305 and block 310 is illustrated. In particular, an example set of records is shown for each database 108 at the sources 104. Each record includes an identifier (e.g. "R1-3"), and corresponding data. The data is shown as a white block if no modifications have been detected, and as a hatched block if modifications have been detected. Thus, the records R2-3 and R3-3 at the source 104-3 have been modified, as has the record R2-2 at the source 104-2.

As a result of the modifications mentioned above, the sources 104-2 and 104-3 are configured, via execution of their respective applications 266, to send modification indicators to the integrator 120 containing at least the record identifiers of the modified records. Therefore, as also shown in FIG. 4, at block 310 the integrator 120 receives and stores, in the repository 216, the record identifiers and corresponding source identifiers. Optionally, the repository 216 can also store a timestamp with each record identifier, as noted earlier. The source 104-1 has not detected any modifications in this instance, and therefore does not transmit any modification indicators to the integrator 120.

Returning to FIG. 3, at block 315, the integrator 120 is configured to determine whether to update scheduling parameter(s) for any of the sources 104. As noted earlier, the integrator 120 maintains distinct scheduling parameters for each source 104. In some examples, the scheduling parameter for each source 104 is a request frequency, indicating the minimum time period between requests for source data records from the integrator 120 to the relevant source 104. In other examples, the scheduling parameter can include a threshold number of records to be retrieved (e.g. such that no request is sent until the threshold is exceeded), or the like.

The scheduling parameters may be dynamically updated in some examples, e.g. to accommodate shifting computational loads or volumes of modifications at the sources 104. In other examples, the scheduling parameters can be set e.g. by an administrator and then remain static. In those examples, blocks 315 and 320 can be omitted. For the present example performance of the method 300, the determination at block 315 is assumed to be negative, and therefore the selection of updated scheduling parameters at block 320 is bypassed. The performance of blocks 315 and 320 will be discussed in greater detail further below.

At block 325, the integrator 120 is configured to determine whether to request source data records from a given source 104, according to the scheduling parameter(s) for that source 104. In other words, the integrator 120 can perform distinct instances, e.g. in parallel, of block 325 (as well as the subsequent blocks of the method 300) for each source 104.

The determination at block 325 is based on the scheduling parameters for the relevant source 104. For example, if the scheduling parameter for the source 104-2 is a request frequency (e.g. one request per hour), the integrator 120 makes the determination at block 325 based on that frequency and on a stored timestamp corresponding to the most recent request sent to the source 104-2. If the time elapsed between the most recent request and the present meets or exceeds the scheduling parameter (i.e. the most recent request was sent at least one hour ago), the determination at block 325 is affirmative. Otherwise, the determination at block 325 is negative. Following a negative determination at block 325, the integrator 120 returns to block 310, although it will be apparent that other instances of block 325, for other sources 104, may result in affirmative determinations.

Figure 5:
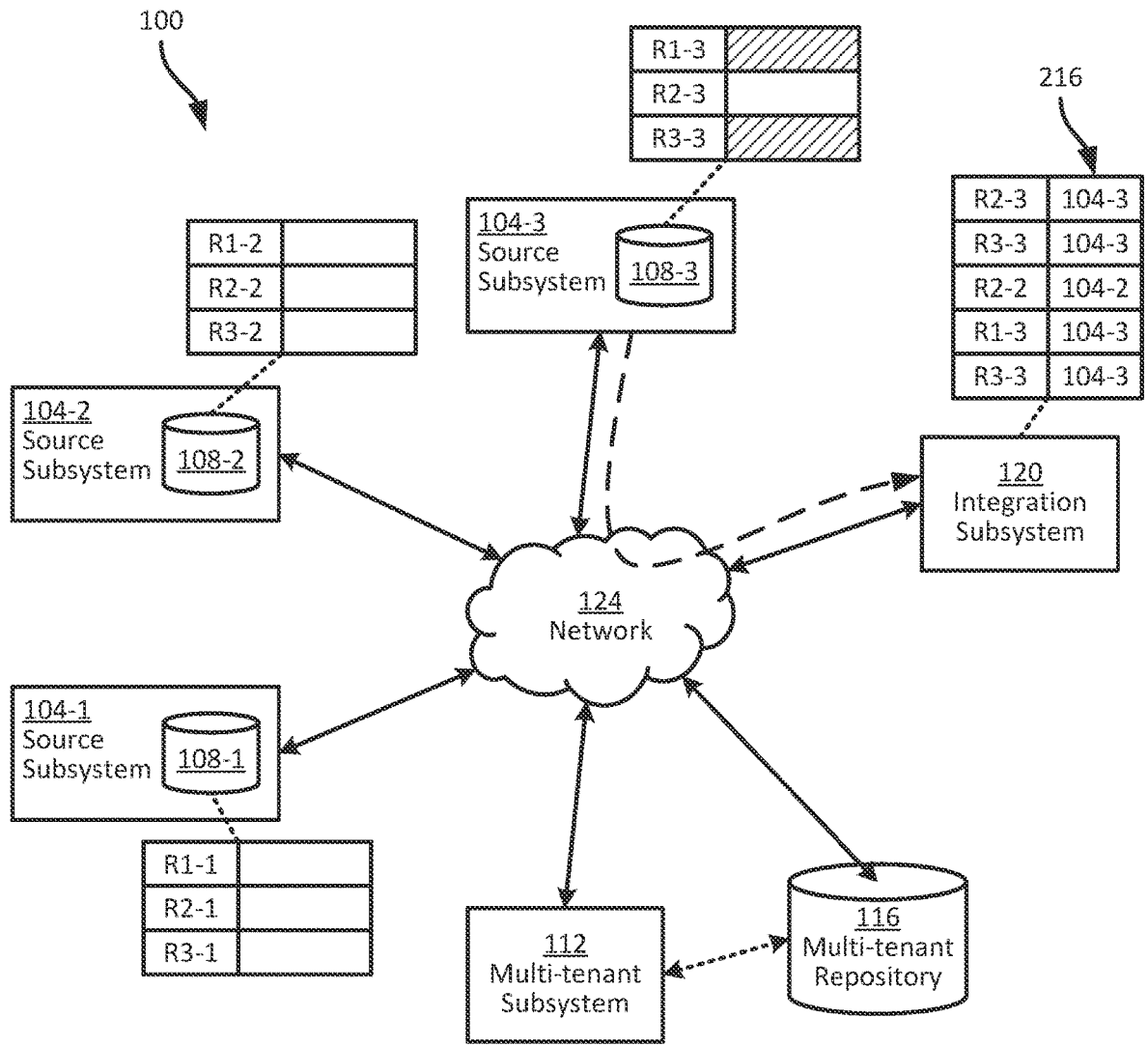
FIG. 5 is a diagram illustrating further example performances of blocks 305 and 310 of the method of FIG. 3.

In the present example, it is assumed that the determinations at block 325 are negative for all three sources 104. The integrator 120 therefore continues collecting modification indicators at block 310. Turning to FIG. 5, additional modifications are shown to the database 108-3, particularly to the records R1-3 and R3-3. The source 104-3 therefore sends two additional modification indicators to the integrator 120, and the repository 216 is therefore updated as illustrated. As will be apparent, the record R3-3 is now represented twice in the repository 216.

Referring again to FIG. 3, and assuming a negative determination at block 315, the integrator 120 is configured to determine at block 325 whether to request source data records from any of the sources 104. In this performance of block 325, it is assumed that the determination is negative for the source 104-2, but affirmative for the source 104-3. That is, the source 104-3 may have a scheduling parameter defining a greater request frequency, and/or the integrator 120 may simply have requested records from the source 104-2 more recently than from the source 104-3. The determination for the source 104-1 at block 325 is negative, because no modification indicators have been received from the source 104-1. Indeed, the integrator 120 can initiate each instance of block 325 (i.e. for each source 104) only upon determining that the repository 216 contains record identifiers for that source 104.

When the determination at block 325 is affirmative, the integrator 120 proceeds to block 330. At block 330, the integrator 120 is configured to retrieve any record identifiers from the repository 216 that are associated with the relevant source 104. For example, in connection with the source 104-3, the integrator 120 retrieves the record identifiers R2-3, R3-3, R1-3, and R3-3 from the repository 216 (whose contents are as illustrated in FIG. 5).

As will be apparent, the retrieved modification indicators include a duplicated record identifier (R3-3). Because the sources 104 simply inform the integrator 120 of any record modifications to reduce the computational load imposed by the applications 266 at the sources 104, the integrator 120 may receive multiple modification indicators for the same record. At block 330, the integrator 120 is therefore also configured to filter the retrieved modification indicators, e.g. to remove duplicate record identifiers, to avoid requesting multiple copies of the same record from a source 104.

Figure 6:
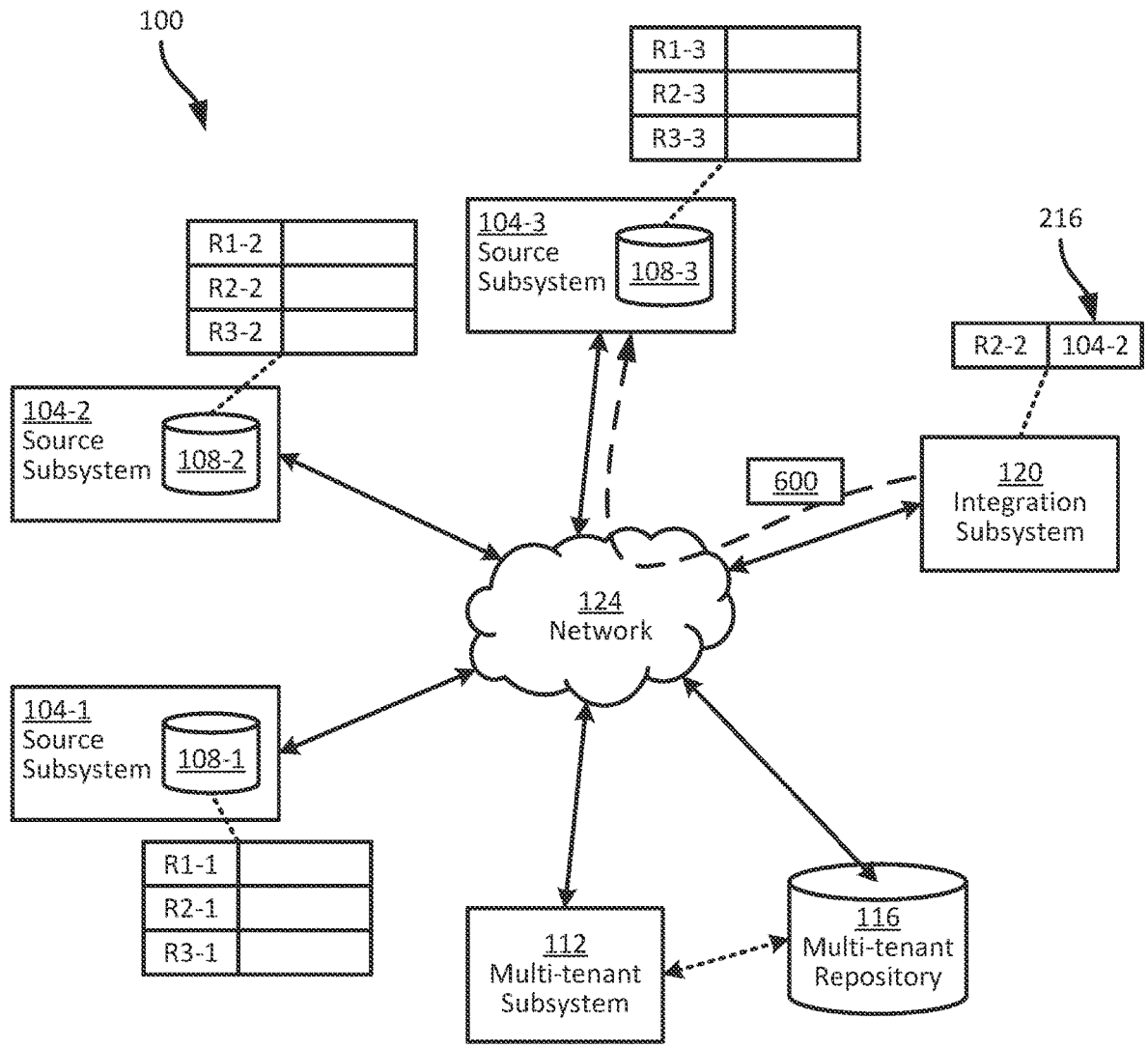
FIG. 6 is a diagram illustrating an example performance of block 335 of the method of FIG. 5.

At block 335, the integrator 120 is configured to send a bulk record request to the relevant source 104, including the filtered record identifiers from block 330. The bulk record request, in other words, is a single request containing all of the filtered record identifiers (i.e. one or more record identifiers) from block 330. FIG. 6 illustrates the transmission of a bulk record request 600 from the integrator 120 to the source 104-3. As will be apparent from discussion above, the request 600 includes the record identifiers R1-3, R2-3, and R3-3. In addition, in response to sending the request, the integrator 120 removes (e.g. deletes) the record identifiers retrieved at block 330 from the repository 216. As a result, the repository 216 contains only one modification indicator, for the source 104-2. In addition, upon sending the request at block 335, the integrator 120 updates the previously mentioned timestamp for the most recent request corresponding to the relevant source 104.

Returning to FIG. 3, at block 340 the integrator 120 is configured receive the requested records from the relevant source 104, e.g. in comma-separated values (CSV) or JavaScript Object Notation (JSON) formats. The records received at block 340 are the entire source data records, rather than simply the record identifiers received at block 310. Having received the source data records, the integrator 120 can store the source data records, e.g. along with a source identifier, in the multi-tenant repository 116. The integrator 120 can also provide (e.g. via a subscription/publication or other suitable mechanism) the source data records to the multi-tenant subsystem 112 for further processing. The subsystem 112 itself may also retrieve the records directly from the repository 116 for further processing.

Thus, over time, as modifications are made to the databases 108 and the integrator 120 requests source data records from the databases 108, the multi-tenant repository 116 will reflect the combined contents of the individual, single-tenant databases 108. Depending on the ability of each source 104 to respond to requests from the integrator 120 without negatively affecting the performance of the source 104, the data in the repository 116 may be updated substantially in real time. For some sources, e.g. those under heavy load, the data in the repository 116 may be updated less frequently, to mitigate the potential for performance degradation that might otherwise result from frequent requests from the integrator 120.

As noted earlier, the scheduling parameters employed by the integrator 120 at block 325 can be dynamically updated. For example, at block 315 the integrator 120 can be configured to poll one or more of the sources 104 to retrieve performance metrics therefrom. The performance metrics can include a utilization metric such as a CPU utilization level. In other examples, the performance metrics can include a remaining query availability. For example, a given source 104 may permit a fixed number of incoming requests per time period, e.g. per day. The remaining number of incoming requests permitted for the source 104 may therefore be retrieved by the integrator 120 and used to update the scheduling parameter(s) for that source 104.

For example, higher utilization at a source 104 can result in reducing the request frequency for that source 104 at the integrator 120, to reduce the demand imposed on the source 104 by the requests at block 335. Conversely, lower utilization at a source 104 can result in increasing the request frequency. The integrator 120 can, for example, compare the utilization to one or more thresholds. The integrator 120 can then increment the request frequency if the utilization falls below a threshold, or decrement the request frequency if the utilization exceeds the threshold. As a further example, the integrator 120 can compare a remaining number of available queries to a threshold, and decrement (i.e. reduce) the request frequency if the remaining query availability falls below a threshold.

The scope of the claims should not be limited by the embodiments set forth in the above examples, but should be given the broadest interpretation consistent with the description as a whole.

The invention claimed is:

1. A method, comprising:
maintaining, at an integration computing device, a scheduling parameter corresponding to a source computing device maintaining a plurality of source data records having respective record identifiers, wherein the scheduling parameter includes at least one of (i) a request frequency, or (ii) a threshold number of records;
receiving, at the integration computing device from the source computing device, a plurality of modification indicators generated at the source computing device in response to modification of corresponding source data records, the modification indicators containing the record identifiers of the corresponding source data records;
storing the modification indicators in a repository at the integration computing device;
according to the scheduling parameter, periodically obtaining, at the integration computing device, a subset of the source data records from the source computing device by:
retrieving the modification indicators from the repository;
generating a bulk record request containing the plurality of record identifiers from the retrieved modification indicators;
transmitting the bulk record request to the source computing device; and
responsive to transmitting the bulk record request, receiving the subset of source data records from the source computing device.

2. The method of claim 1, further comprising
after receiving the subset of source data records, storing the subset of source data records in a central source data repository.

3. The method of claim 1, further comprising:
after receiving the subset of source data records, publishing the subset of source data records to a multi-tenant subsystem for further processing.

4. The method of claim 1, further comprising:
after retrieving the modification indicators, removing the modification indicators from the repository.

5. The method of claim 1, further comprising:
maintaining distinct scheduling parameters for each of a plurality of source computing devices each maintaining respective sets of source data records; and
receiving modification indicators from each source computing device and storing each modification indicator in the repository in association with an identifier of the corresponding source computing device.

6. The method of claim 5, wherein the modification indicators include respective source device identifiers.

7. The method of claim 5, further comprising:
repeating the obtaining, retrieving, generating, and transmitting for each of the source computing devices according to the respective scheduling parameters.

8. The method of claim 1, wherein the scheduling parameter includes a request frequency; and wherein the method further comprises, at the integration computing device:
storing, in response to sending the bulk record request, a timestamp corresponding to the request.

9. The method of claim 1, wherein generating the bulk record request includes detecting and removing duplicate record identifiers from the retrieved modification indicators.

10. A computing device, comprising:
a memory storing a scheduling parameter corresponding to a source computing device maintaining a plurality of source data records having respective record identifiers, wherein the scheduling parameter includes at least one of (i) a request frequency, or (ii) a threshold number of records;
a communications interface; and
a processor coupled with the memory and the communications interface, the processor configured to:
receive, via the communications interface from the source computing device, a plurality of modification indicators generated at the source computing device in response to modification of corresponding source data records, the modification indicators containing the record identifiers of the corresponding source data records;
store the modification indicators in a repository in the memory;
according to the scheduling parameter, periodically obtain a subset of the source data records from the source computing device by:
retrieving the modification indicators from the repository;
generating a bulk record request containing the plurality of record identifiers from the retrieved modification indicators;
transmitter the bulk record request to the source computing device; and
responsive to transmitting the bulk record request, receiving the subset of source data records from the source computing device.

11. The computing device of claim 10, wherein the processor is further configured to:
after receiving the subset of source data records, store the subset of source data records in a central source data repository.

12. The computing device of claim 10, wherein the processor is further configured to:
after receiving the subset of source data records, publish the subset of source data records to a multi-tenant subsystem for further processing.

13. The computing device of claim 10, wherein the processor is further configured to:
after retrieving the modification indicators, remove the modification indicators from the repository.

14. The computing device of claim 10, wherein the processor is further configured to:
maintain distinct scheduling parameters for each of a plurality of source computing devices each maintaining respective sets of source data records; and
receive modification indicators from each source computing device and store each modification indicator in the repository in association with an identifier of the corresponding source computing device.

15. The computing device of claim 14, wherein the modification indicators include respective source device identifiers.

16. The computing device of claim 14, wherein the processor is further configured to:
repeat the obtaining, retrieving, generating, and transmitting for each of the source computing devices according to the respective scheduling parameters.

17. The computing device of claim 10, wherein the scheduling parameter includes a request frequency; and wherein the processor is further configured to:
store, in response to sending the bulk record request, a timestamp corresponding to the request.

18. The computing device of claim 10, wherein the processor is further configured, to generate the bulk record request, to detect and remove duplicate record identifiers from the retrieved modification indicators.

19. A non-transitory computer-readable medium storing instructions executable by a processor of an integration computing device to:
maintain a scheduling parameter corresponding to a source computing device maintaining a plurality of source data records having respective record identifiers, wherein the scheduling parameter includes at least one of (i) a request frequency, or (ii) a threshold number of records;
receive, from the source computing device, a plurality of modification indicators generated at the source computing device in response to modification of corresponding source data records, the modification indicators containing the record identifiers of the corresponding source data records;
store the modification indicators in a repository at the integration computing device;
according to the scheduling parameter, periodically obtain, at the integration computing device, a subset of the source data records from the source computing device by:
retrieving the modification indicators from the repository;
generating a bulk record request containing the plurality of record identifiers from the retrieved modification indicators;
transmitting the bulk record request to the source computing device; and
responsive to transmitting the bulk record request, receiving the subset of source data records from the source computing device.

* * * * *